United States Patent
Serouart et al.

(10) Patent No.: US 7,111,397 B2
(45) Date of Patent: Sep. 26, 2006

(54) METHOD OF FORMING AN INSIDE WALL OF A BEARING FOR SUPPORTING A CYLINDRICAL ELEMENT

(75) Inventors: Florian Serouart, Chaville (FR); Christophe De Kermadec, Versailles (FR)

(73) Assignee: Messier_Dowty SA, Velizy Villacoublay (FR)

( * ) Notice: Subject to any disclaimer, the term of this patent is extended or adjusted under 35 U.S.C. 154(b) by 487 days.

(21) Appl. No.: 10/730,984

(22) Filed: Dec. 10, 2003

(65) Prior Publication Data

US 2004/0111891 A1 Jun. 17, 2004

(30) Foreign Application Priority Data

Dec. 11, 2002 (FR) .................................. 02 15643

(51) Int. Cl.
  *B21D 53/10* (2006.01)
  *B64C 25/50* (2006.01)

(52) U.S. Cl. ..................................... 29/898.054; 29/898

(58) Field of Classification Search ........... 29/898.054, 29/898.056, 898.042, 898.04, 898; 244/50, 244/104 R; 384/558
See application file for complete search history.

(56) References Cited

U.S. PATENT DOCUMENTS 2,279,447 A * 4/1942 Cowey ................... 244/104 R
2,659,637 A * 11/1953 Barr ............................ 384/558
2,747,817 A * 5/1956 Saulnier ....................... 244/50
3,766,792 A * 10/1973 Braun et al. ................. 474/144
3,969,029 A    7/1976 Schaeffler
4,136,582 A    1/1979 Boor
4,396,170 A    8/1983 Turiot et al.
4,688,808 A    8/1987 Iijima

* cited by examiner

*Primary Examiner*—John C. Hong
(74) *Attorney, Agent, or Firm*—Sughrue Mion, PLLC

(57) ABSTRACT

The invention relates to a method of forming the inside wall of a support bearing of given height H and suitable for receiving a cylindrical portion of a cylindrical element for co-operating with the inside wall, said method comprising the steps of estimating a deflection f taken up by the cylindrical element between the center and one of the ends of the support bearing, estimating a nominal radius R using the relationship $R=H^2/8f$, determining an inside wall for the support bearing that occupies a toroidal surface having a throat diameter equal to a diameter of the cylindrical element, ignoring predetermined clearance, and having a meridian radius lying in a range of ±15% about the nominal radius R, and machining the support bearing in such a manner that its inside wall occupies the toroidal surface as determined in this way.

4 Claims, 1 Drawing Sheet

METHOD OF FORMING AN INSIDE WALL OF A BEARING FOR SUPPORTING A CYLINDRICAL ELEMENT

The invention relates to a method of forming an inside wall of a support bearing for supporting a cylindrical element such as a hinge axis or indeed a sliding rod, the cylindrical element being fixed or moving.

BACKGROUND OF THE INVENTION

Most support bearings present an inside wall that is cylindrical. Such support bearings are entirely suitable so long as the bending stiffness of the cylindrical element and/or the load to which the cylindrical element is subjected lead to deformation of the cylindrical element that is negligible relative to the macroscopic dimensions of the support bearing.

When the cylindrical element is more flexible, or when it is subjected to higher loading, the deformation of the cylindrical element is no longer negligible and the cylindrical element then comes to bear against the support bearing in one or more zones of small area, thereby considerably increasing the pressure that is applied locally to the cylindrical element. Under such conditions, the cylindrical element bears on the end of the support bearing, which gives rise to marking on the cylindrical element due to deterioration of its surface coating. This phenomenon leads to a degraded surface state for the cylindrical element which can give rise to the initiation of fatigue cracks.

To solve this problem, proposals have already been made for support bearings having cylindrical inside walls that present chamfers at at least one of the ends of each inside wall. Such support bearings provide a certain amount of improvement over support bearings having inside walls that are purely cylindrical.

Proposals have also been made to give the inside wall of the support bearing a surface that is not cylindrical, but that bulges.

Various types of surface have been considered, and formulae have been proposed for determining the parameters of such surfaces as a function of geometrical data as the height of the support bearing or the diameter of the cylindrical element.

Those formulae have the drawback of taking no account of the stiffness characteristics of the cylindrical element or of the loading actually applied thereto.

To fill out the technical background, reference may be made to U.S. Pat. Nos. 4,396,170, 3,969,029, 4,136,582, and 4,688,808.

OBJECT OF THE INVENTION

An object of the invention is to provide a method of determining a surface for forming the inside wall of the support bearing to comply with said surface while taking account of the stiffness characteristics of the cylindrical element and also of the loading which is applied thereto, while nevertheless avoiding having recourse to complex calculation means, such as by volume finite element calculations, for example.

BRIEF DESCRIPTION OF THE INVENTION

The invention provides a method of forming an inside wall of a support bearing of given height H and designed to receive a cylindrical element, said method comprising the steps of:

estimating a deflection $f$ taken by the cylindrical element between the center and one end of the support bearing, given:

a predetermined loading of the cylindrical element;

predetermined stiffness characteristics for the cylindrical element; and a predetermined assumption concerning thrust between the cylindrical element and the support bearing;

estimating a nominal radius R by the relationship $R=H^2/8f$;

determining an inside wall for the support bearing extending over a toroidal surface having a throat diameter equal to the diameter of the cylindrical element, ignoring predetermined clearance, and having a meridian radius lying in a range of ±15% about the nominal radius R; and machining the support bearing in such a manner that its inside wall occupies the toroidal surface as determined in this way.

Because of the assumptions made in accordance with the invention, deflection can be determined by assuming that the cylindrical element behaves like a prismatic beam, thereby making deflection considerably simpler to estimate.

For example, deflection may be determined by manual calculation using formulae for beam deflection. Deflection can also be determined by a simple finite element model of the beam type. The model is very simple to devise and can be implemented using limited computation means.

The toroidal shape is simple and easily programmed on a numerically-controlled machine tool.

By selecting a surface that is simple to manufacture, and that is determined using rules that are simple, it is possible to give the inside wall of the support bearing a shape that offers a significant decrease in local pressure between the support bearing and the cylindrical element, as it has been possible to verify using complex volume-element computations.

Preferably, the predetermined loading of the cylindrical element corresponds to a severe loading that is likely to occur on average less than once per thousand loadings of the cylindrical element.

The term "severe" is used herein to mean loading which, amongst all envisaged loadings, leads to the greatest deflection of the sliding element, and thus to the smallest nominal meridian radius for the surface of the support bearing.

The criterion retained for deflecting the loading gives an acceptable margin in normal operation of the cylindrical element, and makes it possible to limit the consequences, in terms of the fatigue strength of the cylindrical element, of applying a loading thereto that is more serve than the design loading, given the rareness of more severe loading.

In a particular implementation of the method of the invention adapted to a support bearing that is to be mounted with clamping in a seat, the method includes the step of mounting the support bearing and clamping it in its support, prior to machining the inside wall of the support bearing to take up the determined toroidal surface.

Preferably, when the support bearing is mounted in its seat, its inside wall is cylindrical. By machining the support bearing after it has been mounted on its own support it is possible to ensure that the inside wall of the support bearing does indeed extend along the determined toroidal surface in spite of the deformation imparted to the support bearing by being mounted with clamping.

BRIEF DESCRIPTION OF THE DRAWINGS

The invention will be better understood in the light of the following description given with reference to the figures of the accompanying drawing, in which.

DETAILED DESCRIPTION OF THE INVENTION

The particular embodiment of the invention described in detail herein relates to the bottom bearing at the bottom end of an aircraft landing gear leg.

Figure 1:
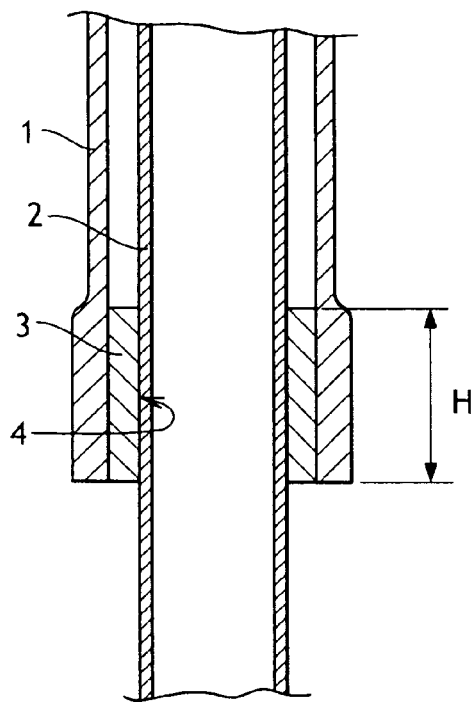
FIG. 1 is a fragmentary section view of the end of an aircraft landing gear leg including a support bearing obtained using the invention.

With reference to FIG. 1, a landing gear leg generally comprises a strut 1 hinged at its top end to the airplane, and slidably receiving a rod 2 whose bottom end carries the wheel(s) (not shown) of the landing gear. The rod 2 slides under the effect of ground reaction forces on the wheels and under the effect of a contrary force applied to the rod 2 by a shock absorber (not shown) included in the strut 1.

The rod 2 slides in the strut 1, being guided by two support bearings, comprising a top support bearing (not shown) at the top of the strut 1, and a bottom support bearing 3 fitted to the bottom portion of the strut 1.

The bottom support bearing 3 is fitted in a seat of the strut 1 and comprises an inside wall which extends facing the rod 2 and which co-operates with the rod 2 so as to guide it in sliding. Throughout this document, the height of the bottom support bearing 3 is written H.

The height H is determined in known manner with reference to the diameter of the rod 2, e.g. by taking into consideration a criterion based on the mean amount of hammering or "peening" that is acceptable between the support bearing 3 and the rod 2. In order to determine the height H, account may also be taken of the ability of the bottom support bearing 3 to withstand being pulled out from its seat, and of the mechanical strength of the seat during application of a load on the rod 2.

The rod 2 is subjected to numerous transverse forces, in particular during landing or while towing the airplane. The wheels do not rotate when they initially make contact with the ground. Setting the wheels into rotation gives rise to rearwardly-directed longitudinal forces (due to resistance to rotation) and forwardlydirected forces (due to the elastic return effect) which cause the rod 2 to be deflected and thus to press very strongly against the inside wall of the bottom support bearing 3 (in particular against the bottom edge thereof), while simultaneously the rod 2 is being pushed into the strut 1 under the effect of ground reaction.

Under such loadings, bracing phenomena between the bottom support bearing 3 and the rod 2 can appear and contribute to damaging the coating of the rod 2 by excessively increasing the peening pressure between the rod 2 and the end of the bottom support bearing 3. Such damage leads to an array of defects being created on the rod 2 extending along the rod 2 like the rungs of a ladder. These defects are liable to give rise to fatigue cracks.

Figure 4:
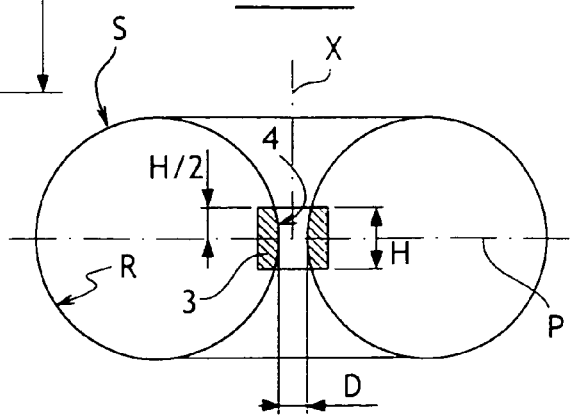
FIG. 4 is a diagrammatic section view of the support bearing obtained using the invention, showing the entire toroidal surface of which the inside wall of the support bearing forms a part.

In order to attenuate this risk, and as can be seen in FIG. 4, the inside wall 4 of the bottom support bearing 3 of the invention occupies a toroidal surface S centered on the axis of symmetry S of the bottom support bearing 3, the toroidal surface S having an equatorial plane P that coincides substantially with the median plane of the bottom support bearing 3.

Figure 3:
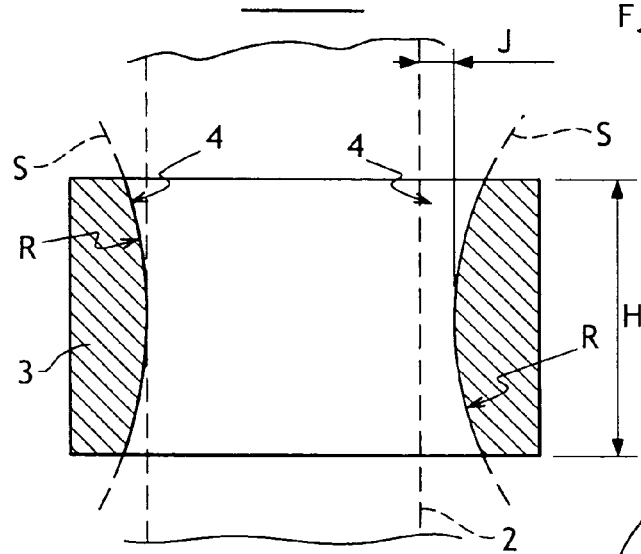
FIG. 3 is a fragmentary view on a larger scale than FIG. 1 showing the bulging surface of the support bearing as obtained using the invention.

The toroidal surface S, and thus the bottom support bearing 3, has a throat of diameter D equal to the diameter of the rod 2, ignoring a predetermined amount of clearance J. The clearance J, shown in FIG. 3, is determined in conventional manner as a function of the diameter of the rod 2.

In accordance with the invention, the meridian radius R of the toroidal surface S is determined as follows.

Figure 2:
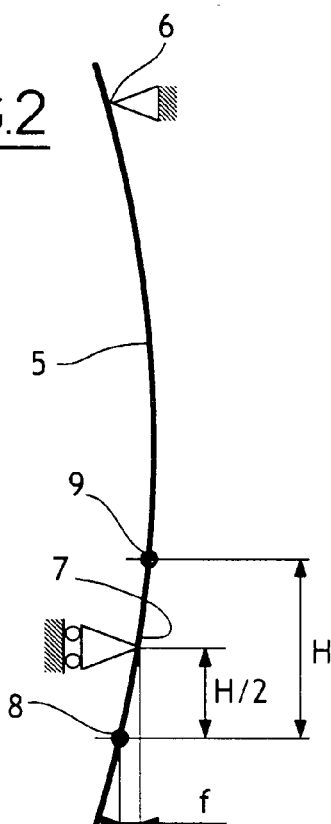
FIG. 2 is a diagrammatic view of the leg shown in FIG. 1 when subjected to determined loading.

With reference to FIG. 2, the method begins by estimating the deflection $f$ of the rod when it is subjected to a predetermined loading, represented in the figure by a transverse force F.

To this end, calculation is performed on the following assumptions:

the rod is considered as behaving as a prismatic beam 5 whose stiffness characteristics are known and given by the shape of the rod and the elastic characteristics of the rod material; and the beam 5 is assumed to be subjected to point thrust 6 near its top end corresponding to the top support bearing, and to bottom point thrust 7 corresponding to the bottom support bearing 3, the point thrusts 6 and 7 being situated substantially at the centers of the top and bottom support bearings of the rod and being considered as being infinitely rigid.

Under these assumptions, it is easy for the person skilled in the art to calculate the deflection of the beam 5 modeling the rod 2, either by using a book of formulae, or by making a simple beam model using finite element software.

An estimate is then made of the deflection $f$ taken by the beam 5 between the center of the bottom support bearing 3, corresponding to the point of thrust 7, and the points 8 and 9 each corresponding to a respective end of the support bearing 3, and thus each situated at a distance H/2 from the point thrust 7. The greater of the two values estimated in this way is then retained.

Once the deflection $f$ has been determined in this way, the nominal meridian radius of the toroidal surface S is then determined using the relationship $R=H^2/8f$.

The bottom support bearing 3 is then machined in such a manner that its inside wall 4 occupies the toroidal surface S.

By way of example, for a bottom support bearing 3 having a height of 75 millimeters (mm) with an estimated deflection $f$ of 1 mm, the meridian radius is substantially 700 mm. The inside wall 4 of the bottom support bearing 3 should thus occupy a toroidal surface which, although not cylindrical, nevertheless presents positive curvature that is very small. The positive curvature of the inside wall 4 is thus exaggerated to a very great extent in FIG. 3.

Complex calculations using volume finite elements have made it possible to verify that a support bearing made in this way can significantly reduce the peening pressure between the support bearing and the rod when subjected to the usual forces.

Such calculations show that the contact zone between the bottom support bearing 3 and the rod 2 is enlarged to a greater extent than it would be for a cylindrical support bearing and is remote from the edge of the bottom support bearing 3, thus making it possible significantly to attenuate the phenomenon of the coating on the rod 2 becoming marked under the effect of loading.

Calculation has also shown that the attenuation obtained in this way remains considerable for support bearings having an inside wall occupying a toroidal surface with a meridian radius lying in the range ±15% about the nominal radius as determined above.

When calculating the deflection, it is preferable to consider a load which is representative of severe loading, e.g. the loading that is likely to occur on average less than one time in one thousand.

This selection gives a nominal radius that is smaller than the nominal radius that would be obtained using a loading representative of ordinary loading, thereby contributing to lowering peening pressure between the bottom support bearing 3 and the rod 2 when subjected to ordinary loading, while nevertheless avoiding the shape of the inside wall of the support bearing degenerating into a toroidal surface of large curvature which would have the result of concentrating thrust in a circular region around the center of the support bearing, which is undesirable.

Furthermore, this selection makes it possible to minimize the impact of a load that exceeds the severe loading selected in this way, given the relative rareness of the selected loading.

For landing gear, the loading that is used for calculation purposes may, depending on circumstances, either be the load of setting the wheels into rotation when landing at the maximum weight for the landing gear, or it may be the load corresponding to the airplane braking when it is at maximum weight, or it may be the load associated with towing.

Once the toroidal surface S has been determined in this way, the inside wall 4 of the bottom support bearing 3 is machined so as to occupy said toroidal surface S.

In another aspect of the invention relating to assembling support bearings in their supports with clamping, it is advantageous to mount the bottom support bearing 3 in the end of the strut 1 complete with the clamping, and then machine the inside wall 4 of the bottom support bearing 3 so that it occupies the toroidal surface S as determined in this way.

It is known that mounting the bottom support bearing 3 with clamping leads to the bottom support bearing 3 being subjected to radial compression so that the inside wall 4 of the bottom support bearing 3 no longer occupies the desired surface. In order to avoid this drawback, it is advantageous to machine the inside wall 4 of the bottom support bearing 3 so that it occupies the toroidal surface S only after it has been mounted in the strut 1.

The amount of material that needs to be removed during this forming operation is generally very small, given that the toroidal surface S is locally very close to the surface of a cylinder given the small positive curvature of the toroidal surface S.

It is then advantageous in accordance with the invention to make provision for the bottom support bearing 3 to be mounted in the strut 1 while the inside wall 4 of the bottom support bearing 3 is cylindrical. This disposition makes it easier to produce the bottom support bearing 3.

The inside wall 4 can no longer be shaped using a reamer as with a conventional support bearing, but shaping can be performed using a machine tool adapted to generate an inside wall of toroidal shape, e.g. a numerically-controlled lathe under suitable programming, or a machine tool having a spindle fitted with a specific head.

The invention is not limited to the particular implementations of the invention described above, but on the contrary covers any variant coming within the ambit of the invention as defined by the claims.

Naturally the invention could be applied to any mechanism in which a cylindrical element co-operating with a support bearing is subjected to transverse forces liable to deflect the cylindrical element.

The particular assumptions described in detail in the above-described implementation of the invention can be subjected to numerous variants, for example the assumption of point thrust could be replaced by an assumption whereby the force between the bottom support bearing 3 and the rod 2 is spread over the full height H of the bottom support bearing 3, or the model of the beam 5 could be simplified by considering the rod 2 to be of constant diameter equal to the mean of the diameters of the rod 2, or indeed by considering that the bearing is transversely movable against the bending stiffness of the strut under the effect of transverse loading. In which case, care should be taken to distinguish between the portion of the transverse displacement to which the sliding element is subjected and the portion corresponding to deformation proper, i.e. the looked-for deflection.

Although in the example shown the support bearing is constituted by a part in the shape of a ring fitted to a seat at the end of the strut, the inside surface could be machined directly in the seat, thus omitting the fitted part.

Although it is stated that the support bearing is symmetrical about a median plane, in more general terms it is possible to provide support bearings for which the equatorial plane of the toroidal surface is offset relative to the median plane. It has been found that with a structure support bearing, the cylindrical element can end up not bearing against the full length of the bearing, so that without interfering with the operation of the assembly, it is possible to omit that portion of the support bearing which does not co-operate with the cylindrical element, thereby making the support bearing asymmetrical. Nevertheless, care should be taken to ensure that the remaining portion of the support bearing is suitable for satisfying other operating constraints, in particular that this portion can resist being pulled out (variant not shown in the figures).

What is claimed is:

1. A method of forming an inside wall of a support bearing of given height H and designed to receive a cylindrical element, said method comprising the steps of:
    estimating a deflection f taken by the cylindrical element between the center and one end of the support bearing, given:
        a predetermined loading of the cylindrical element;
        predetermined stiffness characteristics for the cylindrical element; and
        a predetermined assumption concerning thrust between the cylindrical element and the support bearing;
    estimating a nominal radius R by the relationship $R=H^2/8f$;
    determining an inside wall for the support bearing extending over a toroidal surface having a throat diameter equal to the diameter of the cylindrical element, ignoring predetermined clearance, and having a meridian radius lying in a range of ±15% about the nominal radius R; and
    machining the support bearing in such a manner that its inside wall occupies the toroidal surface as determined in this way.

2. A method according to claim 1, wherein the predetermined loading of the cylindrical element corresponds to a severe loading that is likely to occur on average less than once per thousand loadings of the cylindrical element.

3. A method of forming a support bearing according to claim 1, adapted to a support bearing for mounting with clamping in a support, the method including the step of mounting the support bearing and clamping it in its support, prior to machining the inside wall of the support bearing to take up the determined toroidal surface.

4. A method according to claim 3, wherein, when the support bearing is mounted in its support, its inside wall is cylindrical.

* * * * *